(12) United States Patent
Kuusisto

(10) Patent No.: US 9,552,647 B2
(45) Date of Patent: Jan. 24, 2017

(54) METHOD AND ARRANGEMENT FOR ANALYSING THE BEHAVIOUR OF A MOVING OBJECT

(71) Applicant: Sensisto Oy, Espoo (FI)

(72) Inventor: Markus Kuusisto, Helsinki (FI)

(73) Assignee: SENSISTO OY, Espoo (FI)

(*) Notice: Subject to any disclaimer, the term of this patent is extended or adjusted under 35 U.S.C. 154(b) by 200 days.

(21) Appl. No.: 14/385,388

(22) PCT Filed: Mar. 13, 2013

(86) PCT No.: PCT/FI2013/050282
§ 371 (c)(1),
(2) Date: Sep. 15, 2014

(87) PCT Pub. No.: WO2013/135966
PCT Pub. Date: Sep. 19, 2013

(65) Prior Publication Data
US 2015/0071497 A1    Mar. 12, 2015

(30) Foreign Application Priority Data
Mar. 14, 2012    (FI) ...................................... 20125280

(51) Int. Cl.
*G06T 7/20*    (2006.01)
*G06K 9/00*    (2006.01)
(Continued)

(52) U.S. Cl.
CPC ......... *G06T 7/2033* (2013.01); *G06K 9/00711* (2013.01); *G06K 9/00771* (2013.01);
(Continued)

(58) Field of Classification Search
CPC G06Q 30/02; G06K 9/00711; G06K 9/00771; G06T 7/0042; G06T 7/2033; G06T 2207/10016
See application file for complete search history.

(56) References Cited

U.S. PATENT DOCUMENTS

| 8,009,863 B1 | 8/2011 | Sharma et al. |
| 2006/0200378 A1 | 9/2006 | Sorensen |
| | (Continued) | |

FOREIGN PATENT DOCUMENTS

WO    2004/027556    4/2004

OTHER PUBLICATIONS

International Search Report, dated Dec. 12, 2013, from corresponding PCT/FI2013/050282.
(Continued)

*Primary Examiner* — Siamak Harandi
*Assistant Examiner* — Pinalben Patel
(74) *Attorney, Agent, or Firm* — Young & Thompson

(57) ABSTRACT

The detected movements of an object are analyzed. Each location record includes coordinates of a detected or assumed location of the object and time information. For a number of location records, there is calculated a location-record-specific descriptor value that becomes the more significant the more densely there are other location records around the location record for which the descriptor value is calculated. After selecting a location record that has the most significant descriptor value, those other location records are found that according to their time information are the latest and earliest in a certain environment. The analysis result is that the object stopped at the coordinates of the selected location record for a stopping time calculated from the time information of the latest and earliest location records.

11 Claims, 4 Drawing Sheets

(51) Int. Cl.
 *G06T 7/00* (2006.01)
 *G06Q 30/02* (2012.01)
 *H04N 5/14* (2006.01)

(52) U.S. Cl.
 CPC ........... *G06Q 30/02* (2013.01); *G06T 7/0042* (2013.01); *G06T 7/2053* (2013.01); *G06T 2207/10016* (2013.01); *G06T 2207/30232* (2013.01); *H04N 5/145* (2013.01)

(56) References Cited

U.S. PATENT DOCUMENTS

| | | |
|---|---|---|
| 2007/0244630 A1 | 10/2007 | Toyoshima et al. |
| 2010/0013931 A1 | 1/2010 | Golan et al. |
| 2010/0026802 A1 | 2/2010 | Titus et al. |
| 2010/0185487 A1 | 7/2010 | Borger et al. |
| 2011/0228984 A1 | 9/2011 | Papke et al. |

OTHER PUBLICATIONS

Christian Micheloni, et al.; "Exploiting Temporal Statistics for Events Analysis and Understanding"; 2009; pp. 1459-1469.
Jinshi Cui, et al.; Multi-Modal Tracking of People Using Laser Scanners and Video Camera; 2008; pp. 240-252.
FI Search Report, dated Feb. 20, 2013, from corresponding FI application.

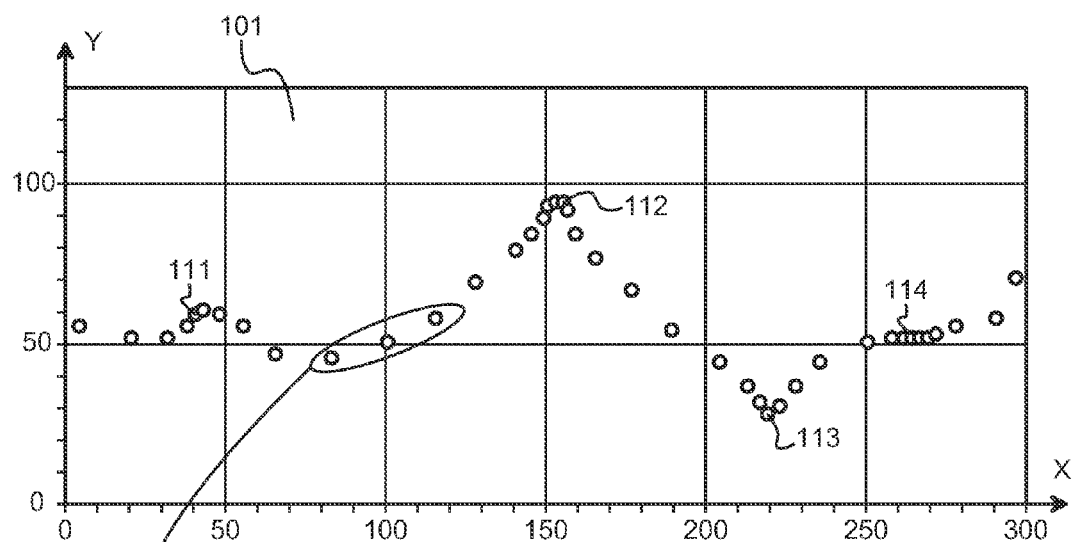
Fig. 1
Fig. 2
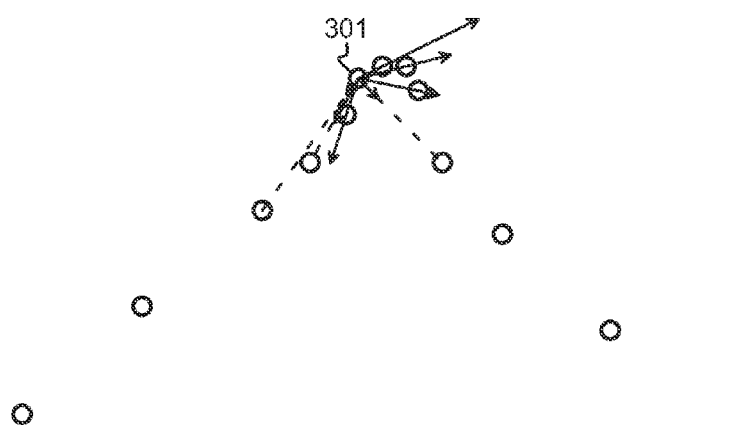
Fig. 3

METHOD AND ARRANGEMENT FOR ANALYSING THE BEHAVIOUR OF A MOVING OBJECT

TECHNICAL FIELD

The invention concerns in general the technology of analysing the observed movements of an object that moves freely or essentially freely within an observed area. In particular the invention concerns the task of providing information about the stops that the object made, and preparing such information for presentation in a way that is intuitive and illustrative for a human observer.

TECHNICAL BACKGROUND

Living beings, meaning humans and animals, move according to their own will. For example the seller of particular products in a store, or the party displaying products on a fair stand, would like to draw the positive attention of as many people as possible. This task becomes easier if some proven evidence exists about how objects of the interesting kind are known to make their (conscious or subconscious) decisions about moving, stopping, and viewing in a similar situation.

In order to collect experimental data about how people behave and what catches their interest, it is common to make field observations. As an example we may consider a supermarket, where a large number of products are made available on shelves. The straightforward experimental setup is one where a human observer discreetly watches the shoppers and makes notes about how they moved along the aisles and where they stopped. The drawbacks of such a setup are related to the understandable weaknesses of a human observer: he or she cannot accurately follow the behaviour of more than one object at a time; the accuracy of following any movements depends on the awareness of the observer; it is practically impossible to measure the stops of the observed object; and the human observer may even unconsciously favour following persons that he or she finds particularly attractive of conspicuous so that the results become biased.

Some of the drawbacks listed above can be at least partially avoided by replacing the human observer with a video camera that films and stores the actual happenings that take place on the observed area, and making the human observer analyse the video footage afterwards. This allows possibilities like replaying sequences, watching some events in slow motion or fast forward, and comparing the happenings on the screen to a simultaneously displayed clock. However, some of the human drawbacks still remain. Additionally this method is time consuming and laborious and cannot, by definition, provide any information in real time.

SUMMARY OF THE INVENTION

According to an aspect of the invention there are provided a method and an arrangement for processing measurement data so that the stops made by observed moving objects can be analysed and illustrated in a reliable, accurate, and intuitive way. According to another aspect of the invention there are provided a method and an arrangement of the mentioned kind with the additional advantage that the processing only requires relatively light resources and can be made quickly, even in real time.

Objectives of the invention are achieved by treating observed consecutive locations of a moving object as centers of gravity, by calculating the resultant forces with which such centers of gravity would interact with each other, and by selecting points experiencing strongest resultant forces as observed stopping points of the object.

A method according to the invention is characterised by the features recited in the characterising part of the independent claim directed to a method.

The invention concerns also an arrangement that is characterised by the features recited in the characterising part of the independent claim directed to an arrangement.

Additionally the invention concerns a computer program product that is characterised by the features recited in the characterising part of the independent claim directed to a computer program product.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

BRIEF DESCRIPTION OF DRAWINGS

FIG. 1 illustrates detected locations of an object within an observation area, FIG. 2 illustrates location records, FIG. 3 illustrates a principle called the gravity-based method.

DETAILED DESCRIPTION OF EMBODIMENTS OF THE INVENTION

Figure 4:
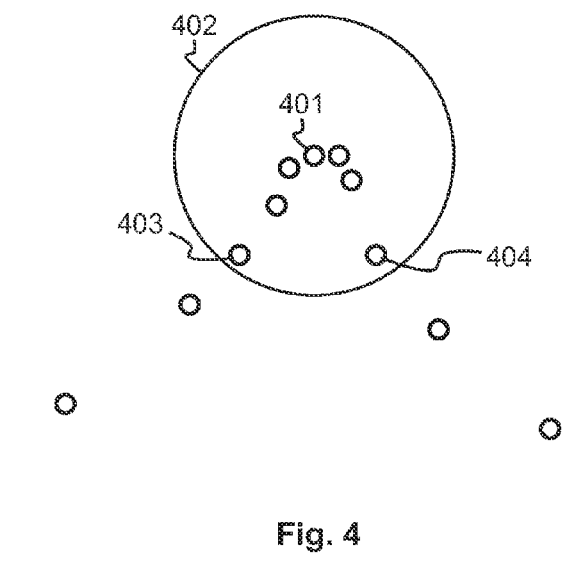
FIG. 4 illustrates a coordinate-based environment.

FIG. 1 illustrates schematically a case in which an object moved within an observed area 101. Some kind of a detection mechanism was used to detect the movements of the object. For a time being we do not need to limit the discussion to any particular detection mechanism. It is sufficient to assume that the momentary location of the object was repeatedly detected. The detected locations of the object are illustrated as small, white circles in FIG. 1. For certain later considerations it is helpful if we assume that the detection of the momentary location of the object was performed at regular intervals, but this is not a necessary requirement of the invention. For the purpose of example we assume that the object proceeded from left to right across the observed area 101 in FIG. 1. In order to make it easier to unambiguously refer to the detected locations it is helpful to define a coordinate system that covers the observed area 101. In FIG. 1 the coordinate system is shown as a two-dimensional Cartesian XY-coordinate system as an example; however the invention does not in any way require the coordinate system to be Cartesian or two-dimensional.

FIG. 2 illustrates an example of providing location records, so that each location record comprises coordinates of a detected location of said object and time information. In the exemplary illustration of FIG. 2 each row of a table constitutes a location record. Three location records that correspond to the three detected locations encircled in FIG. 1 are shown in detail, but we assume that the list of location records comprises a corresponding location record for each detected location of the object. Since the coordinate system in FIG. 1 was Cartesian, the coordinates of each detected location consist of an X coordinate value and an Y coordinate value. The time information comprised in each location record may be an actual time stamp that indicates, at which time (in some suitable timing scheme) the object was detected to be in that particular location. As an alternative, especially if the detection of the momentary location of the object was performed at regular intervals, the time information may be simply an ordinal number of the location record. Also other possibilities exist; for example, if the location of the object was detected by inspecting a sequence of video frames or measurement sweeps, the timing of which is known, the time information comprised in a location record may include a reference to the frame(s) or sweep(s) on the basis of which that particular detection was made.

For the human eye it is relatively easy to discern that if the location detections in FIG. 1 were made at regular intervals, the object seems to have slowed down or even stopped at the four locations illustrated as 111, 112, 113, and 114 respectively. It would therefore be relatively straightforward for the human observer to point out that these were the observed stopping points. However, if the detected locations appear in the form of a list of location records, the same task is much less intuitive. A programmable, electronic data processing system does not have the intuitive capacity of a human in any form, so a method and an algorithm are needed that enable such a data processing system to identify and illustrate the stopping points in a reliable way. It should be noted that the observed trajectory of the object in FIG. 1 is a relatively easy one. If the object is for example a shopper, the movements of whom are followed in a shop, it is not uncommon that much more complicated and difficultly interpreted patterns are encountered.

According to an aspect of the present invention, the approach to be taken can be figuratively modelled as placing a mass of unit magnitude at each detected location of the object, and calculating the scalar magnitude of gravitational interaction experienced by each such mass under the influence of the others. The detected location at which the largest gravitational interaction is found is likely to provide a good representation of a stopping point.

The "gravity-based" approach relies on the intuitive fact that since the magnitude of gravitational interaction between two masses is inversely proportional to the squared distance that separates said masses, a unit mass among other unit masses will experience the most interaction from those of the others that are closest to it. If the object stopped (or almost stopped) at a particular location, and if its location was detected at regular intervals, the stopping point will appear as a point around which a number of detected locations form a relatively dense group.

Even if the explained "gravity-based" approach seems to require that the location detection was always made at regular or essentially regular intervals, this is not actually true. It is sufficient that the detected or assumed location of the object can be provided at essentially regular intervals. Thus it is possible for example to first provide a list of the actual detected locations with the associated time information, and augment the list with interpolated points, each of which represents the assumed location of the object between two actually detected locations. The interpolation can be made for suitable intermediate moments of time so that once completed, the augmented list of location records indicates the detected or assumed location of the object at regular time intervals.

In order to find stopping points there is calculated, for at least a number of the location records, a location-record-specific descriptor value according to a "gravity-based" rule. The rule being "gravity-based" means that the rule makes the descriptor value the more significant the more densely there are other location records around the location record for which the descriptor value is currently calculated. The density of the location records is evaluated in terms of their coordinates; if the location records are plotted for example in a coordinate system like that of FIG. 1, areas of densely located location records are easily seen around the four locations illustrated as 111, 112, 113, and 114.

FIG. 3 illustrates schematically the process of calculating the descriptor value for a location record illustrated as 301, which is close to the assumed stopping point location 112 in FIG. 1. Each vector shown in FIG. 3 represents a pulling force that a unit mass located at 301 would experience because of another unit mass located at a nearby detected location. Only the most significant vectors are shown in FIG. 3 in order to preserve graphical clarity. The location-record-specific descriptor value calculated for the location 301 is then the scalar sum of all lengths of the vectors.

Mathematically we could say that an example of the rule mentioned above defines the calculation of said location-record-specific descriptor value as $$d_i = \sum_{\substack{j \in N_i \\ i \neq j}} \frac{G}{(D(i,j) + a_{min})^p}$$

where
  $d_i$ means the location-record-specific descriptor value of an i:th location record,
  i and j are indices that identify location records,
  $N_i$ means an environment covering all location records around the i:th location record that are to be taken into account in calculating the location-record-specific descriptor value of an i:th location record,
  G is a scalar constant,
  D(i,j) is the distance between the i:th and j:th location records,
  $a_{min}$ is a constant, and
  p is a positive exponent.

Defining the environment $N_i$ is a practical way of limiting the amount of processing that needs to be done in calculating the location-record-specific descriptor values. It is of course possible to have $N_i$ cover all location records for all i, but since the significance of far-lying other location records may become very small (depending on the magnitude of the exponent p), the required processing can be significantly limited without losing very much accuracy by defining $N_i$ to cover for example only such other location records that according to their coordinates are closer than a predetermined limit to the i:th location record.

The scalar constant G does not have much significance, because it will appear similarly in all calculated location-record-specific descriptor values. Mainly it reminds of the gravity analogy; in order to fully resemble the calculation of gravitational interaction, the formula should include the gravity constant. The value of G could well be 1.

Calculating the distance between the i:th and j:th location records is made for example according to the formula $D(i,j)=\sqrt{(x_i-x_j)^2+(y_i-y_j)^2}$ if $(x_i,y_i)$ and $(x_j,y_j)$ are the two-dimensional Cartesian coordinates of the i:th and j:th location records respectively. The general notation $D(i,j)$ covers all ways of expressing the (scalar) distance between the locations represented by the i:th and j:th location record.

The constant $a_{min}$ is a useful way of ensuring that for no value of j the corresponding term in the sum could go to infinity (which would happen if $D(i,j)=0$; i.e. if at the available accuracy the two detected locations would be the same). It introduces a certain minimum distance between the two locations. The value of $a_{min}$ is advantageously of the same order of magnitude as the estimated typical error in detecting the locations. If digital imaging is used for detection, the value of $a_{min}$ could be a small number of pixels. If a laser scanner (to be described in more detail below) is used for detection, the value of $a_{min}$ could be in the order of some millimeters or centimeters.

The magnitude of the exponent p essentially determines how quickly the effect of another location record should die away as a function of increasing distance. For best analogy with gravity, one should select p=2, but the value of p could also be e.g. one or smaller than one, or between one and two, or larger than two. The larger value p has, the more the calculation of the descriptor value emphasizes only very close other location records. Concerning the detected movements of the object, a small value of p allows also less significant slow-downs to be detected as stops while a large value of p tends to limit the consideration to longer and more clearly outstanding stops.

The rule illustrated by the mathematical formula above gives the largest descriptor values as the most significant ones. It is naturally possible to present an alternative formula that would give the descriptor values so that the smallest of them is the most significant one, for example by summing only the powers of location differences $(D(i,j)+a_{min})^p$ instead of their inverses. By knowing what is the exact rule applied to calculating the descriptor values, it can be said which of the calculated descriptor values are the most significant ones. Selecting a location record that has the most significant descriptor value in its surroundings, i.e. that represents a local or global maximum in the significance of the descriptor value, gives most likely stopping point of the object. Mathematical descriptions exist for defining a local or global maximum, but intuitively it is easy to understand the meaning of finding the most significant descriptor value within a number of location records For example in FIG. 3, the location illustrated by the left-hand one of the two topmost circles would most probably be selected as the stopping point.

Saying that the location-record-specific descriptor value is calculated at least for a number of all location records means that some selectivity may be applied for example when the number of location records is very large and they are located very densely along the detected trajectory of the object. In such a case it is in many cases perfectly acceptable to sacrifice some accuracy by only calculating the location-record-specific descriptor value for e.g. every second, every third, or every tenth location record.

After having identified a stopping point, a representative time value should be found for telling, how long the object remained stationary or essentially stationary at or around the identified stopping point. FIG. 4 illustrates an exemplary way of doing this. From a coordinate-based environment of the location record that was selected (illustrated as 401) there are found those other location records that according to their time information are the latest and earliest in said environment.

The coordinate-based environment is illustrated as the circle 402 in FIG. 4. Being coordinate-based means that whether or not another location record belongs to that environment may be decided by investigating the coordinates of the other location records. If the coordinate-based environment of an i:th location record is a circle like in FIG. 4, the j:th location record belongs to that environment if the distance $D(i,j)$ is smaller than the radius of the circle. In an analogous example, if the coordinate-based environment would be e.g. a rectangle centered on the detected stopping point, a comparison of coordinate values would reveal, whether some other location record belongs to that environment.

After all those location records have been found that belong to the coordinate-based environment 402, the latest and earliest location record in that environment can be found by examining the time information contained in the location records. From the time information of the latest and earliest location record in the environment, a stopping time can be calculated. The most straightforward alternative is to just calculate the time difference between time stamps contained in the latest and earliest location records. If the time information has been expressed in some indirect way like as an ordinal number of a location record or as a reference to the number of a video frame from which the location detection was made, slightly more advanced calculations may be needed. Additionally it is possible to process the time difference somehow, for example by only taking some representative fraction of the time difference as the stopping time, in order to account for the fact that the environment covered also points where the object was still moving or again moving.

According to an analysis result that can be output and stored, the object stopped at the coordinates of the selected location record for the stopping time that was calculated from the time information of said latest and earliest location records. How many other stopping points will be announced as analysis results, depends on what is required of the analysis. In some cases it is sufficient to only find the overall most significant descriptor value and use it to derive the results. In other cases it may be that for example all stops longer than a limit, say three seconds, should be revealed.

In the last-mentioned case one possible way to proceed is to go to the location-record-specific descriptor values, find the second most significant descriptor value (because the most significant one was considered already) and use the corresponding location record as a starting point for again placing a coordinate-based environment, finding the latest and earliest location record therein, and so forth. However, certain problems may arise because in many cases the location record with the second most significant descriptor value is very close to the first one, and actually belongs to the same stop of the object.

As an example, we may assume that the location record associated with the detected location 401 in FIG. 4 had the overall most significant descriptor value among all location records. Since the emergence of that descriptor value was based on the close proximity of other detected locations, it is very much possible that the overall second most significant descriptor value will emerge for one of the detected locations immediately to the right or left from the detected location 401, which also have very close neighbours.

In order to focus the search of another stopping point to somewhere else along the trajectory of the object after having selected the location record that has the most significant descriptor value within a number of location records, according to an aspect of the invention the method comprises excluding from further selection location records that are closer than a limit value to the selected location record. Setting the limit value may follow the way in which the environment 402 was defined, but this is not a requirement of the invention. However, it is a relatively logical choice, because as was noted above, the duration of time of the stop at detected location 401 could be announced as equal to the time difference between the latest and earliest location record within the environment 402. In other words, all location records within the environment 402 could be made to logically belong to the stop at the detected location 401, which would advocate excluding all of them from further selection.

Among the location records that remain not excluded, there can be repeated the steps of:
  selecting a (remaining) location record that has the most significant descriptor value in its surroundings (i.e. a local or global maximum within a number of location records),
  from a coordinate-based environment of the selected location record, finding those other location records that according to their time information are the latest and earliest in said environment, and
  outputting and storing (a further) analysis result, according to which said object stopped at the coordinates of the selected location record for a stopping time calculated from the time information of said latest and earliest location records.

The output and stored further analysis result thus indicates that the object also stopped at the coordinates of the location record that was selected in this repeated execution of the selection step.

Figure 5:
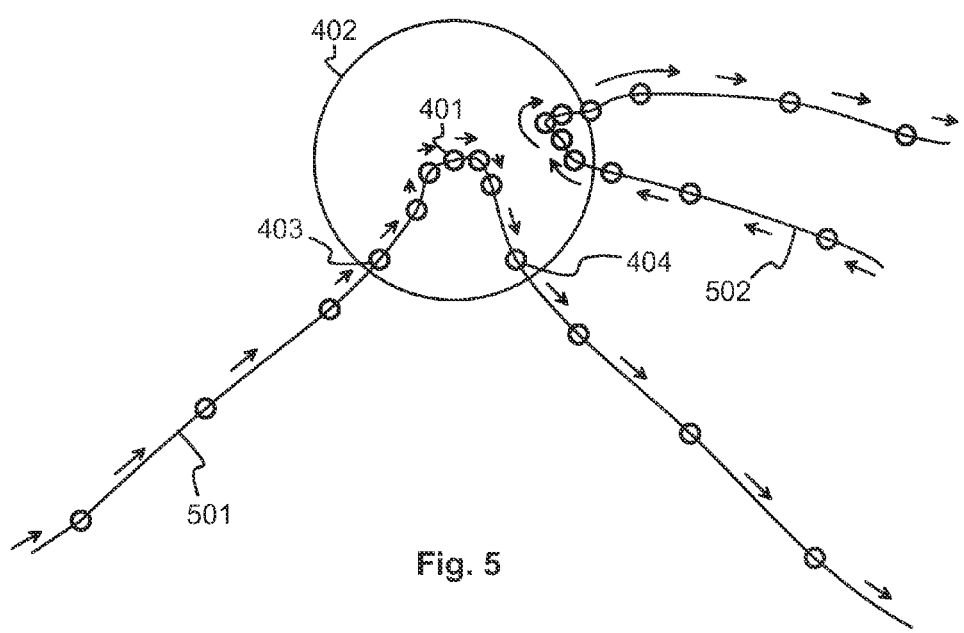
FIG. 5 illustrates the concept of revisiting an environment.

Some further considerations may apply if the object proceeds along a trajectory that revisits the environment of a stopping point. FIG. 5 illustrates a case in which the object first moved along what is illustrated as line 501, and later moved along what is illustrated as line 502. At detected location 401 the object made a stop. In order to find out the time duration of the stop, a coordinate-based environment 402 was considered. However, of all location records that happen to fall within the environment 402, only those are eligible for finding the latest 404 and earliest 403 location record concerning the stop at 401 for which a continuous sequence of temporally consecutive location records exists—within environment 402—that connects them with the selected location record (the one associated with detected location 401). In other words, even if all location records along the line 502 are temporally later than the one associated with detected location 404, none of them is eligible as the latest location record.

Since none of the location records along the line 502 thus belongs to the stop that will be associated with detected location 401, it is logical that when location records are then excluded from further selection, said excluding does not apply to location records within environment 402 if time information of such location records reveals them to be either earlier than the earliest location record 403 or later than the latest location record 404. It is possible that a further significant stop of the object will be found at some of the detected locations along 502, even if some of them are within the coordinate-based environment 402 that applied to the stop at location 401.

Whether or not the location records belonging to line 502 are taken into account in calculating the descriptor values for the location records belonging to line 501, is not limited by the present invention. Both alternatives are possible. Allowing them to be taken into account results in more straightforward calculation of the descriptor values, because location records need not then be examined and discriminated on the basis of their time information. Also, if there was some reason for the object to later come back very close to a previous location, it may be only advantageous (for the purpose of finding the most relevant factors that affect the movements of the object) if the repeated visit makes the associated descriptor values more significant and increase the possibility of a stopping point being identified. However, in some cases allowing repeated visits to be taken into account in calculating the descriptor values may also result in a situation where a location will be identified as a stopping point even if the object actually never stopped there but only passed by a number of times.

If discrimination on the basis of time information is to be applied, it can be realized in many ways. For example, when calculating a descriptor value for a particular location record, one can simply take a time dimension into the definition of the environment $N_i$. That is, one may omit a j:th location record from the calculation of the descriptor value for the i:th location record if the time information of these two location records shows them to be more distant in time than a predetermined limit. Another possibility is to apply a similar "continuous sequence of temporally consecutive location records" type rule as above, including a j:th location record into the environment $N_i$ only if—in addition to the sufficiently short mutual distance in location—a continuous sequence of location records connects the two without going prohibitively far from the i:th location record at any point.

In the embodiments described so far the question "how densely there are other location records around the location record for which the descriptor value is calculated" is answered by summing together contributions from other location records, weighted with their inverse spatial distance from that location record for which the descriptor value is calculated. An alternative way is to take each location record at a time, to define a coordinate-based environment for it, and to look for the earliest and latest other location record within said environment. From the time information associated with said earliest and latest other location record within the environment, an indicative stopping time length can be calculated for the location record that is concerned. In this embodiment there is thus no separate step for calculating a descriptor value; for each location record, a stopping time is directly calculated. Whether or not such other location records (those along line 502 in FIG. 5) should be ignored that represent "revisiting" the environment, is a matter of design choice.

The usefulness of the output and stored analysis results can be greatly emphasized with proper post-processing and presentation. In the following we assume that the objective was to observe the movements of a human shopper in a grocery shop and in particular to detect where the shopper stopped and for how long time. Taken that a coordinate system was employed to define the coordinates of the location records, a few relatively simple measurements typically allow properly overlaying the coordinate system with a floor plan of the observed area in the shop. The result is a map of the space in which the movements of the object were observed, like in FIG. 6, which also illustrates displaying an observed trajectory of the object as a line 601 that connects detected or assumed locations of the object on the map.

Known techniques of graphical illustration can be used to draw the line 601, when the coordinates of the points through which the line should go are known. If the line is drawn following mechanically the shortest path through all points for which a location record exists, the resulting line may look a bit awkward with abrupt angles, especially if location records are relatively scarce; in many cases it may be advisable to calculate a spline or otherwise smoothen the appearance of the line in order to make it more pleasant for the eye. The time information in the location records allows knowing the direction of movement of the object, so it can advantageously be illustrated with small arrows or other intuitive signs.

Figure 6:
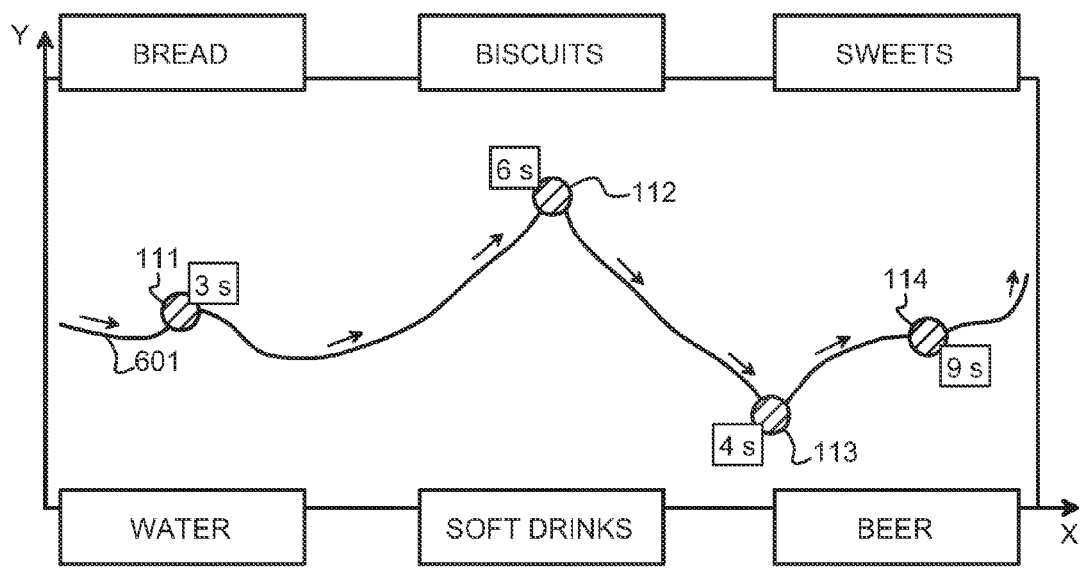
FIG. 6 illustrates a map of a space in which the movements of an object were observed.

FIG. 6 further illustrates schematically emphasizing on said map at least one location that coincides with a point at which the object stopped according to the obtained analysis result. In FIG. 6, four points are emphasized at 111, 112, 113, and 114. Emphasizing a location may comprise for example selecting a displaying color for the emphasized location depending on how long the calculated stopping time was, and/or displaying on said map a numerical indication of the calculated stopping time. For example, from the map of FIG. 6 it is easy to see that an observed shopper stopped briefly (for 3 seconds) between the bread and water shelves, then went to the biscuits shelf for 6 seconds, paid a brief 4-second visit to one end of the beer shelf and then stopped for 9 seconds in the middle of the aisle.

Figure 7:
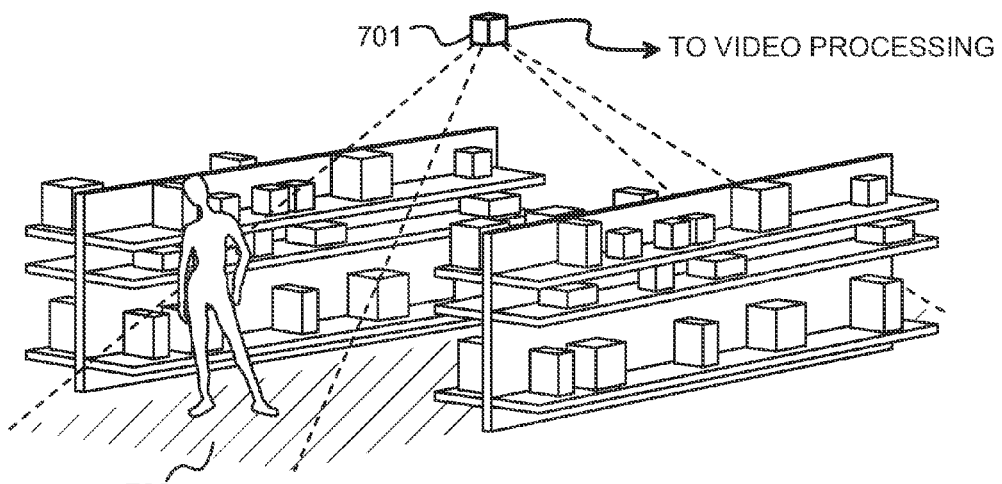
FIG. 7 illustrates a camera installed above an area of interest.
Figure 8:
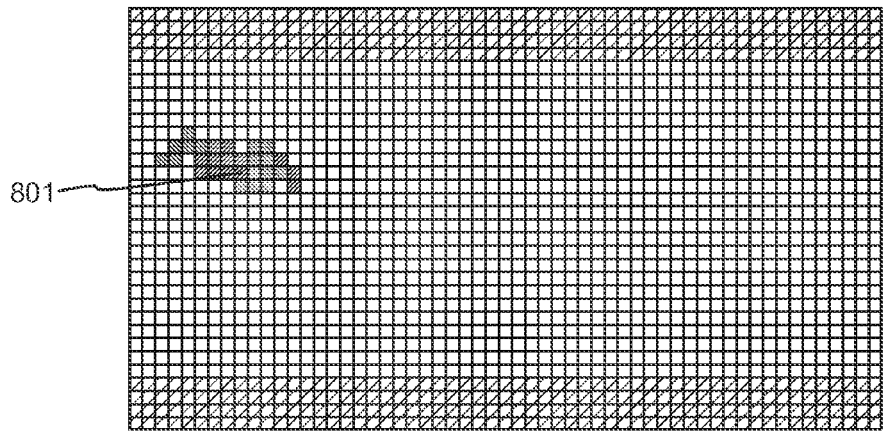
FIG. 8 illustrates an image obtained with a camera like that of FIG. 7.

Up till now we have paid no particular attention to how the coordinates for the location records were originally provided. The present invention does not place any particular requirements to the acquisition of the coordinates, but FIGS. 7 and 8 illustrate some interesting alternatives that also illustrates some potential areas of application of embodiments of the present invention. In the arrangement of FIG. 7 a camera 701 has been installed above an area of interest 702, which in this case is the aisle between two shelves in a shop. If the room is sufficiently high and/or the camera has a wide enough imaging angle, the camera may cover even a much wider area, such as the whole shop, the environment of a large fair stand, or the like. The camera 701 may be for example a digital video camera or a digital still image camera configured for repeated exposures at relatively small intervals.

The raw output data from the camera 701 comprises a sequence of digital images or video frames. If an object of interest, such as a customer, moves on the area of interest 702, a corresponding shape appears at different locations in the images or video frames. From the technology of digital image processing it is known as such that a particular shape, especially a moving shape that appears differently in consecutive images or video frames, can be recognized, its geometric center point or other representative point can be pointed out, and the location of such a point can be announced with reference to the boundaries of the image or video frame for example as the number of pixels up and to the right from the lower left corner of the image or video frame.

If the camera 701 is stationary and its focal length remains constant, the pixel matrix of the image or video frame produced by the camera constitutes a natural Cartesian coordinate system. Announcing the (x,y)-location in pixels of the geometric center point or other representative point of a recognized shape that represents the customer, directly gives coordinates that can be used in location records of the kind discussed above. If the sequence of images or video frames is produced at regular time intervals, an image identifier or a frame number of the image or frame from which the shape was recognized in turn gives directly the time information. Alternatively, from the image identifier or frame number a more explicit time stamp may be straightforwardly derived for insertion into a location record.

FIG. 8 illustrates schematically a simplified video frame, in which each small square constitutes a pixel. By analysing a sequence of video frames, a video processing algorithm can recognize that certain pixel values seem to remain constant in value; these may represent for example some shelves or other fixed structures of the shop in the example of FIG. 7. If a shopper was standing or moving within the field of view, a corresponding group of pixels have a changed colour in the image. In cases where the whole group of pixels can be considered without having to pay much attention to the more accurate details or structure it could reveal, it is customary to call it a blob. A video processing algorithm that receives a video frame like that of FIG. 8 as input can recognize the blob 801, calculate its geometric center point or other representative point, and use its location in terms of pixels in the video frame to form a location record.

Figure 9:
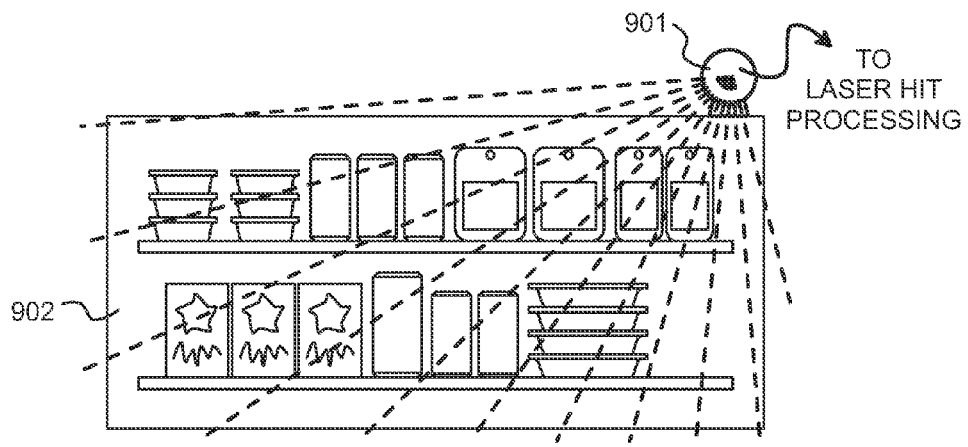
FIG. 9 illustrates an electromagnetic beam scanner installed close to an area of interest.

In the arrangement of FIG. 9 an electromagnetic beam scanner 901 has been installed so that the electromagnetic beam it emits may sweep across an area of interest, which in this case is the imaginary plane immediately in front of goods that stand on a shelf 902. As examples, the beam is shown with dashed lines at ten different locations during the sweep. An example of an electromagnetic beam scanner of this kind is a laser scanner that is configured to emit one or more laser beam(s) on a wavelength that is invisible and harmless to the human eye, to rotate the beam emitter head, and to measure the angle and distance at which a reflection of the laser beam is observed. The laser scanner gives the rotation angle and distance (and in some cases time) at which a reflection was observed as output information. Assuming that the reflection was caused by an object such as a hand 903 that appeared in the plane defined by the sweeping beam(s), the rotation angle and distance already as such constitute coordinates of a detected location of the object. If necessary, a coordinate transformation of a known kind can be applied to transform the angular coordinates into corresponding other coordinates, like Cartesian coordinates.

If time information is not already included in the output data of the electromagnetic beam scanner, it can be added for example by using a readout routine that reads the output data of the electromagnetic beam scanner and augments it with time information. As an example, when the beam emitter head makes one full sweep, the coordinates of each reflection detected during that sweep may be stored in a table labelled with a sequence number or other identifier of the sweep. This way each completed table will appear very much like a video frame taken at an exposure rate equal to the sweeps-per-second rate of the electromagnetic beam scanner. It is also possible to combine several sweeps together in a common table, especially if the sweeps-per-second rate of the electromagnetic beam scanner is so high that a typical object to be detected would appear essentially stationary in a number of consecutive sweeps anyway.

Figure 10:
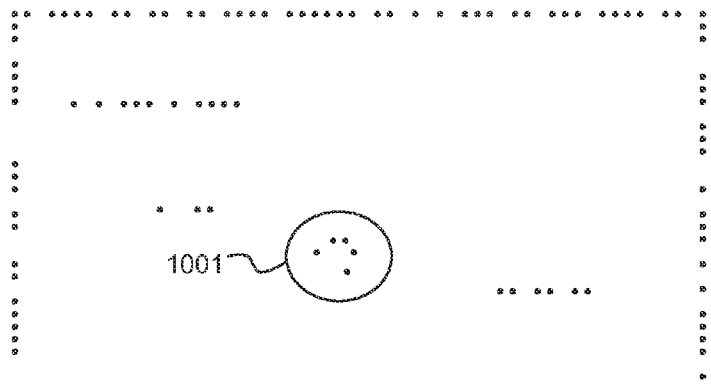
FIG. 10 illustrates hits of an electromagnetic beam scanner plotted in a coordinate system.

FIG. 10 illustrates schematically a number of reflections, also called laser hits, that could have been obtained with one or more sweeps of an electromagnetic beam scanner. Much like the images of fixed structures in a video frame, the output given by an electromagnetic beam scanner may comprise a number of reflections or "image elements" that come from stationary objects and surroundings and thus remain essentially constant in every sweep even for longer durations of time. For example in FIG. 10 we may assume that the essentially regular rectangle of reflections come from the floor, walls, ceiling, or other limiting surfaces of the space in which the electromagnetic beam scanner was installed. Additionally there may be certain essentially constant reflections from shelf edges and/or goods on sale or the like; in FIG. 10 these appear in essentially straight lines here and there inside the regular rectangle.

At location 1001 a group of reflections appear that do not reappear constantly from sweep to sweep over a long period of time, so a processing algorithm could recognize them as representing an object of interest, like the hand of a shopper who is about to pick something from the shelf. A processing algorithm that receives a list of reflections that—when plotted in accordance with their associated angle and distance values—would look like that in FIG. 10 as input can recognize the group of reflections at 1001 much like the blob 801 in FIG. 8, calculate its geometric center point or other representative point, and use its location in terms of the same kind of coordinates as those used for the reflections to form a location record.

Figure 11:
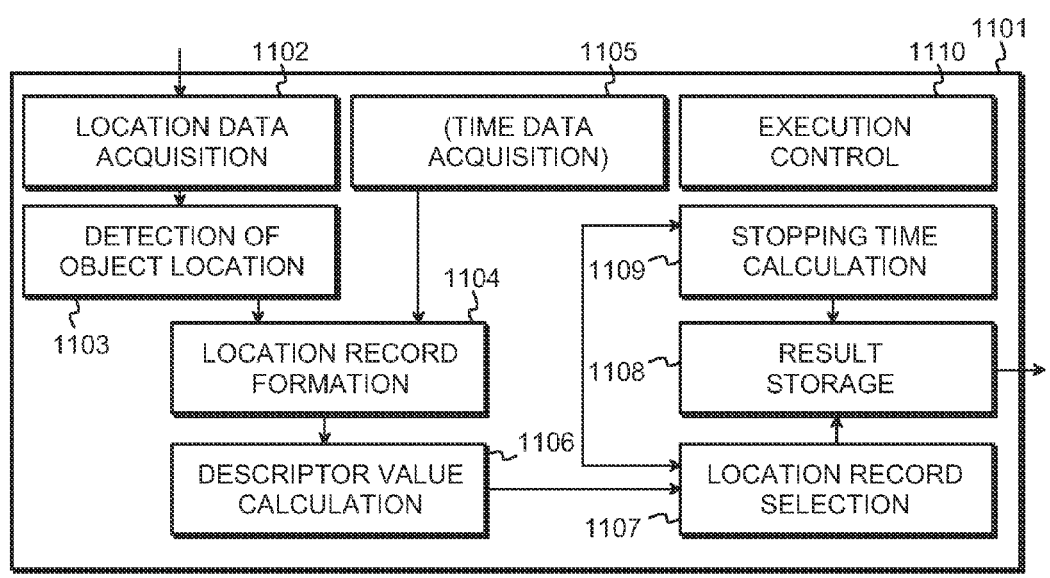
FIG. 11 illustrates an arrangement and a computer program product according to embodiments of the invention.

FIG. 11 illustrates schematically an arrangement 1101 according to an embodiment of the invention. The illustration and its description can also be understood as illustrating a method and a computer program product according to embodiments of the invention, by noting that in the last-mentioned case, the computer program product comprises machine-executable instructions that, when executed by an apparatus, cause the implementation of the actions that in FIG. 11 are illustrated as parts of the arrangement. The computer program may be embodied on a volatile or a non-volatile computer-readable record medium, for example as a computer program product comprising at least one computer readable non-transitory medium having program code stored thereon.

The blocks 1102, 1103, and 1104 illustrated as location data acquisition, detection of object location, and location record formation respectively may implement, individually and/or in various combinations, a location record storage that is configured to store location records, each location record comprising coordinates of a detected or assumed location of said object and time information. The location data acquisition block 1102 is illustrated as implementing an input to the arrangement, through which information in various forms may enter the arrangement. As an example, the location data acquisition block 1102 may comprise a video subsystem that includes one or more video cameras, and the detection of object location block 1103 may comprise a location calculator configured to calculate coordinates of where the object is located in a coordinate system defined in respect of a video image produced through said one or more video cameras. Such coordinates then constitute the input of forming the actual location records in block 1104. It may derive time information to be included in the location records from the way in which the location data is acquired, for example by noting, from which video frame the coordinates of a detected object were derived. Alternatively or additionally the arrangement may comprise a dedicated time data acquisition block 1105, from which comes the time data that will end up in the location records.

The arrangement of FIG. 11 comprises also a descriptor value calculator 1106. It is configured to calculate, for a number of location records, a location-record-specific descriptor value according to a rule. The rule makes said descriptor value the more significant the more densely there are other location records around the location record for which the descriptor value is calculated.

The arrangement of FIG. 11 comprises also a selector 1107 configured to select a location record that has the most significant descriptor value within a number of location records and to find, from a coordinate-based environment of the selected location record, those other location records that according to their time information are the latest and earliest in said environment. Further comprised in the arrangement is a result storage 1108 that is configured to store an analysis result, according to which said object stopped at the coordinates of the selected location record for a stopping time calculated from the time information of said latest and earliest location record. For calculating the stopping times there is shown a particular stopping time calculator 1109. Conceptually it may also assist the selector in block 1107 in excluding from further selection location records that are closer than a limit value to location record that was selected on the basis of its most significant descriptor value.

Many additions and modifications to the schematic principles shown in FIG. 11 are possible without departing from the scope of protection defined by the appended claims. For example, in addition or as an alternative to the video subsystem, the arrangement may comprise an electromagnetic beam scanner that is configured store coordinates of where in a coordinate system defined in respect of the electromagnetic beam scanner the object is located when an electromagnetic beam emitted by the electromagnetic beam scanner is found to hit the object. Other means for detecting the momentary location of an object include but are not limited to the use of radio waves and/or acoustic waves. For example, if the object is carrying a radio transmitter such as a bluetooth or wlan transmitter, a mobile phone, or other wireless terminal of a cellular radio system, it is possible to receive the transmitted signals at multiple locations and use the differently timed receptions to calculate the position of the transmitter. If the object is emitting acoustic noise, acoustic microphones can be used for similar reception time based positioning calculations.

The functions that have been shown as separate blocks in FIG. 11 can be combined into common blocks and/or distributed into different kinds of functional entities. It is not necessary to have the whole invention implemented in a single device, but similar functionalities can be distributed in various different devices, which then together constitute an arrangement according to an embodiment of the invention.

In the described examples it was assumed that the field of view of the imaging device, or otherwise the area monitored by the technical means that are capable of producing the location records, is fixed. This is not mandatory, because it is also possible to generate a sequence of images representing a particular field of view on basis of a original sequence of images captured by an imaging device that is not completely fixed but whose movement with respect its position or orientation is known, thereby providing a field of view that may vary from one image to another. Assuming that the orientation and position of the imaging device for each of the images of the original sequence images is known, it is possible to apply pre-processing to modify images of the original sequence of images in order to create a series of images having a fixed field of view. Combining different partial images into one is known as stitching in the technology of digital image processing.

Saying that some limit or threshold value or other reference is "predetermined" does not require that the limit, threshold value or other reference should remain fixed: for example, it is possible to use an adaptive algorithm that changes the limit, threshold value or other reference adaptively in relation to some observed conditions. Such a changing value is "predetermined" in the sense that the algorithm will react in a deterministic way and perform the adaptation in a way that follows the intentions of the programmer.

The invention claimed is:

1. A method for analysing the detected movements of an object, comprising:
   a) providing location records, each location record comprising coordinates of a detected or assumed location of said object and time information,
   b) for a number of said location records, calculating a location-record-specific descriptor value according to a rule, wherein said rule makes said descriptor value the more significant the more densely there are other location records around the location record for which the descriptor value is calculated,
   c) selecting a location record that has the most significant descriptor value within a number of location records,
   d) from a coordinate-based environment of the selected location record, finding those other location records that according to their time information are the latest and earliest in said environment, and
   e) outputting and storing an analysis result, according to which said object stopped at the coordinates of the selected location record for a stopping time calculated from the time information of said latest and earliest location records, wherein,
      after having selected the location record that has the most significant descriptor value within a number of location records, excluding from further selection location records that are closer than a limit value to the selected location record, and
      among the location records that remain not excluded, repeating steps c), d) and e) in order to output and store a further analysis result, according to which said object also stopped at the coordinates of the location record selected in the repeated execution of step c).

2. A method according to claim 1, wherein:
   at step d), only such other location records are eligible for finding said latest and earliest location record for which a continuous sequence of temporally consecutive location records exists within said environment that connects them with the selected location record, and
   said excluding from further selection does not apply to location records within said environment if time information of such location records reveals them to be either earlier than said earliest location record or later than said latest location record.

3. A method according to claim 1, wherein said rule defines the calculation of said location-record-specific descriptor value as $$d_i = \sum_{\substack{j \in N_i \\ i \neq j}} \frac{G}{(D(i, j) + a_{min})^p}$$

where $d_i$ means the location-record-specific descriptor value of an i:th location record, i and j are indices that identify location records, $N_i$, means an environment covering all location records around the i:th location record that are to be taken into account in calculating the location-record-specific descriptor value of an i:th location record, G is a scalar constant, $D(i,j)$ is the distance between the i:th and j:th location records, $a_{min}$ is a constant, and p is a positive exponent.

4. A method according to claim 1, comprising:
   displaying a map of a space in which the movements of said object were observed,
   displaying an observed trajectory of said object as a line that connects detected or assumed locations of said object on said map, and
   emphasizing on said map at least one location that coincides with a point at which the object stopped according to the analysis result of step e).

5. A method according to claim 4, comprising at least one of the following:
   selecting a displaying color for the emphasized location depending on how long was the stopping time calculated at step e),
   displaying on said map a numerical indication of the stopping time calculated at step e).

6. A method according to claim 1, wherein providing the coordinates for the location records at step a) comprises at least one of the following:
   videoing the movements of said object and calculating coordinates of where the object is located in a coordinate system defined in respect of a video image produced through said videoing,
   scanning a monitored space with an electromagnetic beam scanner and storing coordinates of where in a coordinate system defined in respect of the electromagnetic beam scanner the object is located when an electromagnetic beam emitted by the electromagnetic beam scanner is found to hit the object.

7. A method according to claim 1, wherein said environment comprises those location records whose distance from the selected location record is smaller than a predefined distance.

8. An arrangement for analysing the detected movements of an object, comprising:
   at least one processor, and
   at least one computer readable non-transitory medium having program code stored thereon, wherein,
   the at least one computer readable non-transitory medium stores location records, each location record comprising coordinates of a detected or assumed location of said object and time information,
   the at least one processor is configured to calculate, for a number of location records, a location-record-specific descriptor value according to a rule, wherein said rule makes said descriptor value the more significant the more densely there are other location records around the location record for which the descriptor value is calculated, the at least one processor is configured to select a location record that has the most significant descriptor value within a number of location records and to find, from a coordinate-based environment of the selected location record, those other location records that according to their time information are the latest and earliest in said environment, and the at least one computer readable non-transitory medium is configured to store an analysis result, according to which said object stopped at the coordinates of the selected location record for a stopping time calculated from the time information of said latest and earliest location record, wherein, after having selected the location record that has the most significant descriptor value within a number of location records, the at least one processor is configured to exclude from further selection location records that are closer than a limit value to the selected location record, and among the location records that remain not excluded, the at least one processor is configured to repeat selecting a location record that has the most significant descriptor value within a number of location records and finding, from a coordinate-based environment of the selected location record, those other location records that according to their time information are the latest and earliest in said environment, and the at least one computer readable non-transitory medium is configured repeat storing an analysis result, according to which said object stopped at the coordinates of the selected location record for a stopping time calculated from the time information of said latest and earliest location record, in order to output and store a further analysis result, according to which said object also stopped at the coordinates of the location record selected in the repeated execution of selecting a location record that has the most significant descriptor value within a number of location records.

9. An arrangement according to claim 8, comprising a video subsystem that includes one or more video cameras, wherein the at least one processor is configured to calculate coordinates of where the object is located in a coordinate system defined in respect of a video image produced through said one or more video cameras.

10. An arrangement according to claim 8, comprising an electromagnetic beam scanner configured store coordinates of where in a coordinate system defined in respect of the electromagnetic beam scanner the object is located when an electromagnetic beam emitted by the electromagnetic beam scanner is found to hit the object.

11. A computer program product for analysing the detected movements of an object, the computer program product comprising at least one computer readable non-transitory medium having program code stored thereon, which program code comprises machine-executable instructions that, when executed by a programmable device, cause the implementation of:
    a) providing location records, each location record comprising coordinates of a detected or assumed location of said object and time information,
    b) for a number of said location records, calculating a location-record-specific descriptor value according to a rule, wherein said rule makes said descriptor value the more significant the more densely there are other location records around the location record for which the descriptor value is calculated,
    c) selecting a location record that has the most significant descriptor value within a number of location records,
    d) from a coordinate-based environment of the selected location record, finding those other location records that according to their time information are the latest and earliest in said environment, and
    e) outputting and storing an analysis result, according to which said object stopped at the coordinates of the selected location record for a stopping time calculated from the time information of said latest and earliest location records, wherein,
        after having selected the location record that has the most significant descriptor value within a number of location records, excluding from further selection location records that are closer than a limit value to the selected location record, and
        among the location records that remain not excluded, repeating steps c), d) and e) in order to output and store a further analysis result, according to which said object also stopped at the coordinates of the location record selected in the repeated execution of step c).

* * * * *